Patented Oct. 29, 1946

2,410,397

UNITED STATES PATENT OFFICE 2,410,397

PREPARATION OF ARYLIDES OF AROMATIC ORTHO-HYDROXY CARBOXYLIC ACIDS

Robert H. Weiss, Plainfield, and Andrews C. Wintringham, Glen Ridge, N. J., assignors to American Cyanamid Company, New York, N. Y., a corporation of Maine No Drawing. Application May 26, 1943, Serial No. 488,591

20 Claims. (Cl. 260—559)

This invention relates to an improved process for producing arylides of aromatic o-hydroxy carboxylic acids and more particularly to improvements in the isolation of these products from crude reaction mixtures.

Arylides of aromatic o-hydroxy carboxylic acids are usually prepared by reacting the corresponding arylamine with the acid in the presence of a condensing agent such as phosphorus trichloride or thionyl chloride, or reacting the acid chloride of the carboxylic acid with the amine in the presence of an acid binding agent capable of reacting with the hydrochloric acid set free in the reaction.

In either case it is desirable and in fact customary to use diluents such as toluene, monochlorobenzene and the like. An excess of the amine itself may also be used as a diluent, but because of its higher cost it is customary to use cheaper liquids. In every case a reaction mixture is obtained which contains the arylide, unreacted materials, the diluent and other products, some of which are tarry in nature.

Several methods have been used in the past to isolate the arylide from the reaction mixture. One of the methods treats the reaction mixture with water and an alkaline agent to neutralize any free acid, followed by stripping off the diluent and the unreacted amine by the use of steam. This method has a serious disadvantage in that the tarry impurities produced remain behind with the arylide and are very difficult to remove.

Another method involves the use of a diluent in which the arylide has low solubility, and in this case the reaction mixture is filtered without steam stripping. This procedure is useful only where an inert solvent is used in which the arylide is not appreciably soluble. Otherwise large losses occur. Even in the case of solvents which have little or no solvent action on the arylide the filtration is not readily effected because a dense firmly packed filter cake frequently results, and this cannot be readily washed with aqueous solutions, which washing step is necessary, of course, in order to remove impurities and excess organic solvent.

A further method involves neutralization with water and alkali, followed by filtration without stripping off the solvent. This is objectionable in the case of solvents which dissolve appreciable quantities of the arylide, as described above, and has the further objection that emulsions are frequently encountered which greatly interfere with the smooth progress of filtration.

The present invention depends on an entirely different method. The reaction mixture containing the arylide is neutralized with a dilute aqueous solution of an alkali, such as sodium carbonate or bicarbonate, as described in the last mentioned method, and then a large part, but not all, of the organic solvent is stripped off or, if desired, all of the organic solvent may be stripped off and a measured quantity of organic solvent added to the reaction mixture. The charge, containing a small amount of organic solvent, after cooling to room temperature, is filtered and the cake washed, first with a small amount of organic solvent, and then with dilute aqueous solutions of mild alkali, and of acid, and finally with water. The removal of the major portion of solvent avoids difficulties involved where there is some solubility of the arylide in the solvent, and at the same time all of the advantages due to the presence of solvent are retained because it requires only a small amount of solvent to maintain in solution or redissolve the tarry alkali insoluble impurities. At the same time the small amount of solvent present does not introduce any particular difficulties due to emulsion formation.

The method of the present invention avoids all of the difficulties of the prior art, and at the same time does not introduce either complicated or expensive additional steps. In fact, the procedure is more simple, and no compromise between high recovery, cheap process and high purity of the product is necessary.

The present invention is applicable in general to the arylides of aromatic o-hydroxy carboxylic acids. Typical of such acids are those belonging to the benzene series, such as salicylic acid and various mono- and dimethyl substituted salicylic acids, o-hydroxy acids of the naphthalene series, such as the various o-hydroxy naphthoic acids, o-hydroxy acids of the anthracene series such as 2-hydroxy-3-anthroic acid, o-hydroxy carbazole carboxylic acids or benzocarbazole carboxylic acids, and also o-hydroxy acids of higher molecular weight series, such as chrysene, pyrene, fluorene, diphenylene oxide and diphenylene sulfide. Of major practical importance are the arylides of 2-hydroxy-3-naphthoic acid which form a very important group of azo dye coupling components. Also 5,6,7,8 - tetrahydro - 2-hydroxy-3-naphthoic acid is included as it has the hydroxy and carboxylic groups on the aromatic ring.

The aromatic amines from which the arylides useful in the process are derived may belong to the benzene series, such as aniline and its homologues, e. g. toluidines and xylidines, and substituted products such as chloro, bromo, alkoxy, aryloxy, nitro, cyano, and sulfonamide derivatives. Amines of condensed nuclei, such as naphthylamines and amines of the biphenyl series are also included, as well as heterocyclic amines such as 2-amino-diphenyleneoxide.

The present invention is generally applicable to reactions using almost any inert diluent or solvent, that is to say liquids which do not react with the o-hydroxy carboxylic acid, the amine or the arylide. About the only limitation on the solvent or diluent is that it should have adequate solvent action on tarry impurities. Aromatic hydrocarbons, such as those of the benzene series, are excellent solvents and the halogenated hydrocarbons, particularly the chlorinated hydrocarbons, are even better suited and many of them are very cheap. Typical diluents are toluenes, xylenes, monochlorobenzene or o-dichlorobenzene. For technical operation monochlorobenzene is particularly good.

Because the present invention effects filtration in the presence of a relatively small amount of a solvent, which does not necessarily have to be a portion of the original reaction mixture, a further degree of flexibility is imparted to the process in that it is entirely feasible to carry out the main reaction in the presence of one diluent, steam strip it, and then add a small amount of another diluent to effect the filtration step of the present invention. This permits the use of a diluent in the main reaction which would not be suitable for the purification step because it does not dissolve tarry impurities or because it has excessive solvent action on the arylide. A very cheap diluent can, therefore, be used in the main reaction and, if necessary, a more expensive diluent or solvent in the filtration step because the amount in the latter case is much smaller. This greater flexibility is an important advantage of the present invention and makes the choice of optimum conditions simpler for the plant chemist.

It is an advantage of the present invention that the amount of diluent which must remain in the reaction mixture when partial stripping is used, or the amount of diluent which is added after total stripping is effected, is not critical. In general, smaller amounts than 25% of the weight of the arylide are not desirable as their effect in dissolving tarry impurities and permitting ease of filtration is not sufficeint. Amounts in excess of 200% of the weight of the arylide are also in general undesirable, particularly where there is some solvent action on the arylide, or where the diluent is particularly easily emulsified with aqueous media. The preferred range of quantities for best practical operation lies between 40% and 200%, although in its broader aspects the invention includes procedures in which less diluent is used. In general it is desirable to use as little diluent as possible consistent with complete purification, and the optimum amount will vary not only with the particular diluent used, but also with the particular arylide produced.

While it is an advantage of the present invention that in many cases, particularly when operating under optimum conditions, a washed filter cake is obtained of such high purity that it requires no further purification, it should be understood that the invention is not limited to the production of products of this extreme purity and in certain cases further purification by conventional means may be employed.

The invention will be described in greater detail in conjunction with the following specific examples in which the parts are by weight.

Example 1

188 parts of beta-hydroxy naphthoic acid, 123 parts of ortho-anisidine and 1500 parts of monochlorobenzene are heated to 70° C., and 55 parts of phosphorus trichloride are added. The reaction mixture is then heated up to boiling and refluxed until complete. Thereupon it is cooled and a dilute aqueous solution of sodium bicarbonate added with agitation until the charge is faintly alkaline. The neutralized reaction mixture is then heated to boiling and all but 113 parts of monochlorobenzene stripped off. This represents approximately 40% of the calculated weight of the arylide. The partially stripped charge is then cooled to room temperature, filtered, and the filter cake washed with dilute aqueous solutions of a mild alkali, then acid, and finally with pure water. These washings remove unreacted beta-hydroxy naphthoic acid and amine. The remaining arylide is then dried and melts at 162–164° C., and dissolves in aqueous caustic soda to give a clear solution. A high yield is obtained.

When the above procedure is followed but all of the monochlorobenzene stripped off the arylide obtained melts at 158–161° C., and dissolves in aqueous caustic soda to form a solution having very marked turbidity. Loss of yield by leaving in the small amount of monochlorobenzene is less than 5%.

When the procedure of the above example is followed but none of the monochlorobenzene stripped off only 75% as much arylide is obtained.

Example 2

The procedure of Example 1 is followed but all of the monochlorobenzene is stripped off. Before the charge is cooled to room temperature 113 parts of monochlorobenzene are added with stirring. The results obtained are substantially identical with those of Example 1, the product melting at 162–164° C., and the yield being practically the same.

Example 3

188 parts of beta-hydroxy naphthoic acid, 137 parts of ortho-phenetidine and 1500 parts of monochlorobenzene are heated to 70° C., and 55 parts of phosphorus trichloride added. The reaction mixture is then heated under reflux until reaction is complete, cooled and neutralized to faint alkalinity with a dilute aqueous solution of sodium bicarbonate. The neutralized mixture is then heated to the boiling point of water and all of the monochlorobenzene stripped off by steam. Thereupon 113 parts of monochlorobenzene are returned to the kettle and the charge cooled to room temperature, filtered, washed with dilute aqueous solutions of mild alkali, and of acid, followed by a pure water wash. The dried filter cake consists of the phenetidide, which melts at 159–160° C.

When the above procedure is followed but no monochlorobenzene reintroduced the arylide obtained melts at 155–157° C., and does not give a clear solution in aqueous caustic soda. Loss of yield by the presence of the 113 parts of monochlorobenzene amounts to only about 5%.

Example 4

188 parts of beta-hydroxy naphthoic acid, 143 parts of alpha-naphthylamine and 1800 parts of monochlorobenzene are heated to 70° C., and 55 parts of phosphorus trichloride added. The reaction mixture is then heated up and refluxed until reaction is complete. Thereupon the mixture is slightly cooled and dilute aqueous sodium bicarbonate added to slight alkalinity. The neutralized reaction mixture is then heated to the boil and the major portion of the monochlorobenzene stripped off by steam, leaving about 400 parts in the reaction mixture, which is then cooled, filtered, washed with a small amount of fresh monochlorobenzene and then with aqueous solutions of mild alkali, and of acid, followed by water. The dried filter cake consists of arylide melting at 219–221° C., which dissolves in aqueous caustic soda to a clear solution.

When the above procedure is followed but all of the monochlorobenzene is stripped off the resulting arylide melts at 215–216° C., and gives a very turbid solution in aqueous caustic soda.

*Example 5*

To a solution of 188 parts of beta-hydroxy napthoic acid in 1600 parts of monochlorobenzene, there is slowly added 48 parts of phosphorus trichloride at room temperature, and the reaction mixture is stirred for a number of hours to complete the formation of the 2,3-hydroxy naphthoyl chloride. Toward the end of the stirring 110 parts of ortho-toluidine are added and the temperature slowly increased to the boiling point with refluxing, until evolution of hydrogen chloride practically ceases.

The reaction mixture is then cooled slightly and an aqueous solution of sodium bicarbonate run in until the charge is slightly alkaline. All but 400 parts of the monochlorobenzene is then steam stripped off, and the charge cooled to room temperature, filtered, and washed in the usual manner with dilute solutions of mild alkali, and of acid. The resulting arylide melts at 195–197° C. and dissolves in aqueous caustic soda to form a clear solution.

When the above procedure is followed, but all of the monochlorobenzene removed by steam stripping, the arylide produced has a 2° C. lower melting point and dissolves in caustic soda to form a cloudy solution.

*Example 6*

188 parts of beta-hydroxy naphthoic acid, 123 parts of ortho-anisidine and 1500 parts of toluene are heated to 70° C. and 55 parts of phosphorus trichloride added. The reaction mixture is then slowly heated to the boil and refluxed until reaction is complete.

The reaction mixture is cooled and a dilute solution of sodium bicarbonate added until the mixture is faintly alkaline. This is then heated to the boil and all but 115 parts of the toluene steam stripped off. Thereupon, the charge is cooled to room temperature, filtered, and the filter cake washed with dilute solutions of mild alkali, acid, and finally water. After drying an arylide is obtained melting at 162–164° C., which dissolves in aqueous caustic soda to give a clear solution.

*Example 7*

138 parts of salicylic acid, 137 parts of ortho-phenetidine, and 1500 parts of monochlorobenzene are heated to 70° C. and 55 parts of phosphorus trichloride gradually added. The mixture is then heated to the boil and refluxed until reaction is complete. On cooling all of the product remains in solution, and dilute sodium bicarbonate is added until the mixture is faintly alkaline. Thereupon, the mixture is heated to the boil and all but 113 parts of monochlorobenzene stripped off.

The reaction mixture is then cooled to room temperature, filtered, and the filter cake washed with dilute solutions of mild alkali, acid and water. On drying an arylide is obtained which dissolves in aqueous caustic soda to form a clear solution.

We claim:

1. In a method of isolating an arylide of an aromatic orthohydroxy carboxylic acid from a reaction mixture resulting from the reaction of the hydroxy acid with an aromatic amine in the presence of a condensing agent, the improvement which comprises neutralizing any acid present and effecting filtration in the presence of an inert organic solvent for tarry impurities selected from the group consisting of liquid hydrocarbons of the benzene series and liquid chlorinated hydrocarbons, the amount of the solvent being from 25 to 200% by weight of the arylide.

2. In a method of isolating an arylide of an aromatic orthohydroxy carboxylic acid from a reaction mixture resulting from the reaction of the hydroxy acid with an aromatic amine in the presence of a condensing agent, the improvement which comprises neutralizing any acid present and effecting filtration in the presence of an inert organic solvent for tarry impurities selected from the group consisting of liquid hydrocarbons of the benzene series and liquid chlorinated hydrocarbons, the amount of the solvent being from 40 to 200% by weight of the arylide.

3. A method of recovering an arylide of an orthohydroxy carboxylic acid from its reaction mixture resulting from the reaction of the hydroxy acid with an aromatic amine in the presence of a condensing agent and an inert organic diluent capable of dissolving tarry impurities selected from the group consisting of liquid hydrocarbons of the benzene series and liquid chlorinated hydrocarbons, which comprises neutralizing any acid present, removing the major portion of the diluent by vaporization, leaving from 25 to 200% on the weight of the arylide and recovering the arylide from the resulting mixture by filtration.

4. A method of recovering an arylide of an orthohydroxy carboxylic acid from its reaction mixture resulting from the reaction of the hydroxy acid with an aromatic amine in the presence of a condensing agent and an inert organic diluent capable of dissolving tarry impurities selected from the group consisting of liquid hydrocarbons of the benzene series and liquid chlorinated hydrocarbons, which comprises neutralizing any acid present, removing the major portion of the diluent by vaporization, leaving from 40 to 200% on the weight of the arylide and recovering the arylide from the resulting mixture by filtration.

5. A method of recovering an arylide of an orthohydroxy carboxylic acid from its reaction mixture resulting from the reaction of the hydroxy acid with an aromatic amine in the presence of a condensing agent and an inert organic diluent capable of dissolving tarry impurities selected from the group consisting of liquid hydrocarbons of the benzene series and liquid chlorinated hydrocarbons, which comprise removing substantially all of the diluent by vaporization, adding to the charge an amount of an inert organic diluent capable of dissolving tarry impurities selected from the group consisting of liquid hydrocarbons of the benzene series and liquid chlorinated hydrocarbons, the amount added being from 25 to 200% of the weight of the arylide and recovering the arylide from the mixture by filtration.

6. A method of recovering an arylide of an orthohydroxy carboxylic acid from its reaction mixture resulting from the reaction of the hydroxy amine with an aromatic amine in the presence of a condensing agent and an inert organic diluent capable of dissolving tarry impurities selected from the group consisting of liquid hydrocarbons of the benzene series and liquid chlorinated hydrocarbons, which comprises removing substantially all of the diluent by vaporization, adding to the charge an amount of an inert organic diluent capable of dissolving tarry impurities selected from the group consisting of liquid hydrocarbons of the benzene series and liquid chlorinated hydrocarbons, the amount added being from 40 to 200% of the weight of the arylide and recovering the arylide from the mixture by filtration.

7. A method of recovering an arylide of beta-hydroxy naphthoic acid from its reaction mixture resulting from the reaction of the beta-hydroxy naphthoic acid with an aromatic amine in the presence of a condensing agent and an inert organic diluent capable of dissolving tarry impurities selected from the group consisting of liquid hydrocarbons of the benzene series and liquid chlorinated hydrocarbons, which comprises neutralizing any acid present, removing the major portion of the diluent by vaporization, leaving from 25 to 200% on the weight of the arylide and recovering the arylide from the resulting mixture by filtration.

8. A method of recovering an arylide of beta-hydroxy naphthoic acid from its reaction mixture resulting from the reaction of the beta-hydroxy napthoic acid with an aromatic amine in the presence of a condensing agent and an inert organic diluent capable of dissolving tarry impurities selected from the group consisting of liquid hydrocarbons of the benzene series and liquid chlorinated hydrocarbons, which comprises neutralizing any acid present, removing the major portion of the diluent by vaporization, leaving from 40 to 200% on the weight of the arylide and recovering the arylide from the resulting mixture by filtration.

9. A method of recovering an arylide of beta-hydroxy naphthoic acid from its reaction mixture resulting from the reaction of the beta-hydroxy naphthoic acid with an aromatic amine in the presence of a condensing agent and an inert organic diluent capable of dissolving tarry impurities selected from the group consisting of liquid hydrocarbons of the benzene series and liquid chlorinated hydrocarbons, which comprises removing substantially all of the diluent by vaporization, adding to the charge an amount of an inert organic diluent capable of dissolving tarry impurities selected from the group consisting of liquid hydrocarbons of the benzene series and liquid chlorinated hydrocarbons, the amount added being from 25 to 200% of the weight of the arylide and recovering the arylide from the mixture by filtration.

10. A method of recovering an arylide of beta-hydroxy naphthoic acid from its reaction mixture resulting from the reaction of the beta-hydroxy naphthoic acid with an aromatic amine in the presence of a condensing agent and an inert organic diluent capable of dissolving tarry impurities selected from the group consisting of liquid hydrocarbons of the benzene series and liquid chlorinated hydrocarbons, which comprises removing substantially all of the diluent by vaporization, adding to the charge an amount of an inert organic diluent capable of dissolving tarry impurities selected from the group consisting of liquid hydrocarbons of the benzene series and liquid chlorinated hydrocarbons, the amount added being from 40 to 200% of the weight of the arylide and recovering the arylide from the mixture by filtration.

11. A method of preparing an arylide of beta-hydroxy naphthoic acid which comprises reacting the beta-hydroxy naphthoic acid in an inert organic diluent capable of dissolving tarry impurities and selected from the group consisting of liquid hydrocarbons of the benzene series and liquid chlorinated hydrocarbons with the desired aromatic amine in the presence of sufficient phosphorus trichloride to act as a condensing agent, neutralizing any acid present in the reaction mixture and effecting filtration in the presence of an amount of the organic diluent from 25 to 200% of the weight of the arylide.

12. A method according to claim 1 in which the solvent is monochlorobenzene.

13. A method according to claim 4 in which the diluent is monochlorobenzene.

14. A method according to claim 6 in which the diluent is monochlorobenzene.

15. A method according to claim 8 in which the diluent is monochlorobenzene.

16. A method according to claim 10 in which the diluent is monochlorobenzene.

17. A method according to claim 8 in which the arylide is the ortho-anisidide and the diluent is monochlorobenzene.

18. A method according to claim 10 in which the arylide is the ortho-anisidide and the diluent is monochlorobenzene.

19. A method according to claim 8 in which the arylide is the ortho-phenetidide and the diluent is monochlorobenzene.

20. A method according to claim 10 in which the arylide is the ortho-phenetidide and the diluent is monochlorobenzene.

ROBERT H. WEISS.
ANDREWS C. WINTRINGHAM.